July 28, 1959     H. O. LEWIS     2,896,446
MAGNETOSTRICTIVE DISC TEST OSCILLATOR
Filed March 8, 1957
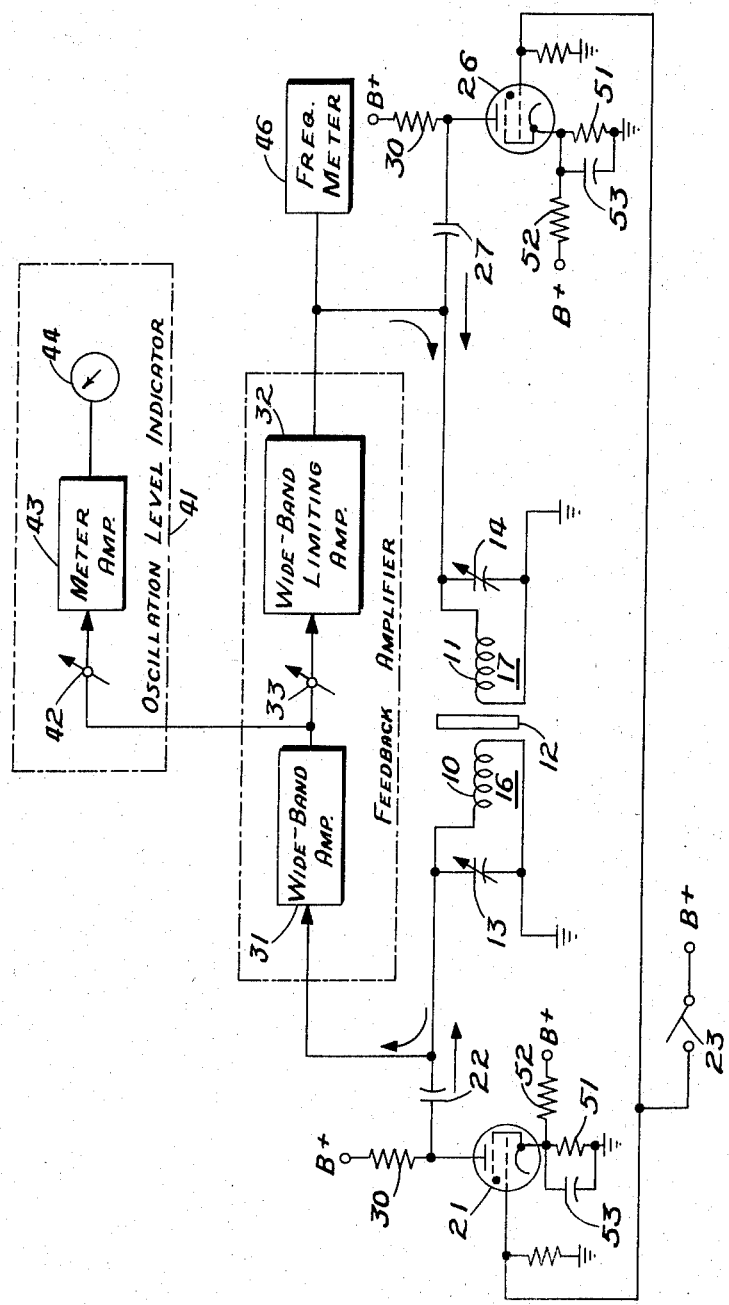
INVENTOR.
HERBERT O. LEWIS
BY
ATTORNEYS United States Patent Office 2,896,446
Patented July 28, 1959

2,896,446

MAGNETOSTRICTIVE DISC TEST OSCILLATOR

Herbert O. Lewis, Canoga Park, Calif., assignor to Collins Radio Company, Cedar Rapids, Iowa, a corporation of Iowa Application March 8, 1957, Serial No. 644,838

3 Claims. (Cl. 73—67.2)

This invention relates to means for testing the frequency of magnetostrictive discs used in the manufacture of mechanical filters of the type described and claimed in Patent No. 2,615,981, titled "Electromechanical Filters," and Patent No. 2,717,361, titled "Mechanical Filters," both to Melvin Doelz.

The manufacturing process of mechanical-filter discs requires knowledge of the resonant frequency of each disc used in the construction of such a mechanical filter. For example, in a common type of mechanical filter, each disc is tuned to the center frequency of the filter. This invention provides means for quickly determining the resonant frequency of such discs, when they are made of magnetostrictive material. The invention includes an oscillator circuit wherein the magnetostrictive discs are the frequency determining element of the circuit.

The invention includes a a pair of coils axially aligned on opposite sides of the disc. A large transient-magnetizing current is initially provided through the coils to induce a residual magnetism. Then, a feedback circuit induces oscillatory magnetic fields in the coils to excite disc resonances with the same symmetrical mode vibration that is obtained by the disc when used in a mechanical filter.

A pair of gas-discharge tubes are connected through discharging capacitors to the respective coils to provide the initial transient-current surge through the coils to magnetize the opposite surfaces of the disc. The feedback loop includes a limiting amplifier. A frequency meter is connected at the output of the limiting amplifier to indicate the oscillating frequency, which is the center frequency of the disc.

Further objects, features and advantages of this invention will be apparent to a person skilled in the art upon further study of the specification and the single figure, which is a schematic-block diagram of the invention.

Now referring to the invention in more detail, the figure illustrates a pair of coils 10 and 11, with a magnetostrictive disc 12 received axially between them. A pair of adjustable capacitors 13 and 14 are respectively connected across coils 10 and 11 to provide parallel resonant circuits 16 and 17, each having one side connected to ground.

A first gas-discharge tube 21 has its plate connected through a resistor 30 to a B plus voltage source. A discharge capacitor 22 is connected between the plate of tube 21 and the other side of resonant circuit 16. One side of a switch 23 is connected to the grid of gas discharge tube 21; and a grid-leak resistor 25 is provided. The cathode of tube 21 is connected to a point on a voltage divider comprising resistors 51 and 52, which is connected between ground and the B plus source. Another capacitor 53 is connected across resistor 51.

Similarly, a second gas-discharge tube 26 is provided and is connected in the same manner as tube 21. A discharge capacitor 27 is connected between the plate of tube 26 and the other side of resonant circuit 17. The same side of switch 23 is connected to the grid of gas discharge tube 26. The opposite side of switch 23 is connected to the B plus voltage source.

A wide-band amplifier 31 has its input connected to the ungrounded side of resonant circuit 16. Furthermore, a wide-band limiting amplifier 32 has its input connected through a gain control 33, such as a potentiometer, to the output of amplifier 31. The output of limiting amplifier 32 is connected to the ungrounded side of the other resonant circuit 17 to complete the feedback loop.

Wide-band amplifiers are used to avoid phase shift in the feedback loop.

An oscillation level indicator 41 is also connected to the output of wide-band amplifier 31. This indicator is used in adjusting the circuit as well as checking its operation. Oscillation level indicator 41 includes a gain control 42, a meter amplifier 43 and a meter 44, which may be a vacuum-tube voltmeter.

A frequency meter 46, which may be of the pulse counting type, is connected to the output of limiting amplifier 32. Wide-band limiting amplifier 32 provides an essentially constant drive level to frequency meter 16 and coil 11. Gain control 33 permits adjustment of the voltage level at the input of amplifier 32 to a point within the limiting region. Limiting is required for stable oscillation. Gain control 42 is set for a convenient indication on oscillation level meter 44.

In operation, disc 12 is inserted axially between the coils 10 and 11. Switch 23 is closed to cause a large current surge through the respective coils 10 and 11 by actuation of the gas tubes through the discharge capacitors serially connected to them. The large current surge causes a large unidirectional flux about the coils that magnetizes the adjacent surfaces of the disc. This is a permanent magnetization, although the retentivity is low in value. This permanent magnetization is, however, essential to proper magnetostrictive operation. Capacitors 13 and 14 are adjusted to obtain a peak indication on oscillation level meter 44.

Disc 12 acts as an electromagnetic shield between coils 10 and 11. Thus, the test oscillator circuit has a magnetostrictive coupling link provided by the disc. Thus, the feedback received by coil 11 acts to physically vibrate the disc by magnetostrictive action; and its physical vibration causes inverse magnetostrictive action which electrically excites opposite coil 10 to complete the feedback loop and sustain operation. Due to the high Q of such magnetostrictive discs, the indication on frequency meter 46 is stable after the disc is inserted to indicate the center frequency of disc. Thus, the center frequency of the disc is instantly and automatically provided by oscillator action to the frequency meter.

Although this invention has been described with respect to a particular embodiment thereof, it is not to be so limited, as changes and modifications may be made therein which are within the full intended scope of the invention as defined by the appended claims.

I claim:

1. Testing means for magnetostrictive mechanically resonant discs, comprising a pair of coils having a space between them for receiving any of said magnetostrictive discs, a pair of capacitors respectively connected across each of said coils to resonate them at a frequency near the frequency of said disc, each of said coils being connected to ground on one side, feedback-amplifier means having its input connected to one of said coils and its output connected to the other of said coils, amplitude-limiting means included within said feedback-amplifier to limit its output amplitude, a frequency meter connected to the output of said amplifier means, transient high-current means connected serially with each of said coils and switching means for initially actuating said current means; said transient high-current means comprising first and second gas discharge tubes, first and second discharge capacitors, and a switch; with a direct-voltage source connected to one side of said switch, said first discharge capacitor connected between said first coil and the plate of said first gas tube, said second discharge capacitor connected between the plate of said second tube and said second coil, a positive direct-current source connected to one side of said switch, and the other side of said switch connected to the control grids of said first and second discharge tubes.

2. A magnetostrictive disc test oscillator as defined in claim 1 in which said feedback amplifier means comprises a wide-band amplifier having its input connected to said first coil, a wide-band limiting amplifier having its output connected to said second coil, and gain adjusting means connected between the output of said wide-band amplifier and the input to said wide-band limiting amplifier.

3. A magnetostrictive disc test oscillator as defined in claim 1, comprising an oscillator level indicator, having a current meter, a meter-amplifier having its output connected to said meter, and an adjustable attenuator connected between the output of said wide-band amplifier and the input to said meter-amplifier.

References Cited in the file of this patent

UNITED STATES PATENTS 1,543,124   Ricker _____ June 23, 1925